(12) United States Patent
Shen (10) Patent No.: US 10,665,904 B2
(45) Date of Patent: May 26, 2020

(54) SECONDARY BATTERY MANUFACTURED BY ARRANGEMENT SIMULTANEOUSLY POSSESSING ADVANTAGES SPECIFIC TO WINDING PROCESS AND ADVANTAGES SPECIFIC TO STACKING PROCESS

(71) Applicant: Lumimodule Optical Corporation, Taipei (TW)

(72) Inventor: Meng-Wei Shen, Taipei (TW)

(73) Assignee: LUMIMODULE OPTICAL CORPORATION, Taipei (TW)

( * ) Notice: Subject to any disclaimer, the term of this patent is extended or adjusted under 35 U.S.C. 154(b) by 331 days.

(21) Appl. No.: 15/581,235

(22) Filed: Apr. 28, 2017

(65) Prior Publication Data

US 2018/0123184 A1 May 3, 2018

(30) Foreign Application Priority Data

Oct. 28, 2016 (TW) .............................. 105135444 A (51) Int. Cl.

| H01M 10/42 | (2006.01) |
|---|---|
| H01M 4/66 | (2006.01) |
| H01M 2/02 | (2006.01) |
| H01G 11/68 | (2013.01) |
| H01G 11/26 | (2013.01) |
| H01G 11/82 | (2013.01) |

(Continued)

(52) U.S. Cl.

CPC ........ *H01M 10/4264* (2013.01); *H01G 11/08* (2013.01); *H01G 11/12* (2013.01); *H01G 11/22* (2013.01); *H01G 11/26* (2013.01); *H01G 11/30* (2013.01); *H01G 11/68* (2013.01); *H01G 11/82* (2013.01); *H01M 2/0217* (2013.01); *H01M 2/348* (2013.01); *H01M 4/661* (2013.01); *H01M 10/0431* (2013.01); *H02H 5/04* (2013.01); *H01M 2200/10* (2013.01); *H02J 7/0031* (2013.01); *H02J 7/00302* (2020.01); *H02J 7/00306* (2020.01)

(58) Field of Classification Search

None

See application file for complete search history.

(56) References Cited

U.S. PATENT DOCUMENTS

| 6,444,357 B1 * | 9/2002 | Kambe | ................... | H01M 4/02 |
|---|---|---|---|---|
| | | | | 429/149 |
| 2001/0031391 A1 * | 10/2001 | Hironaka | ................ | H01M 2/06 |
| | | | | 429/94 |

(Continued)

*Primary Examiner* — Carmen V Lyles-Irving
(74) *Attorney, Agent, or Firm* — Guice Patents PLLC (57) ABSTRACT

A secondary battery, including: a plurality of first aluminum foils, each two adjacent foils of the first aluminum foils being separated by a first preset gap and connected with each other by a first adhesive tape, each of the first aluminum foils having a first electrode lug, and all the first electrode lugs being connected in parallel for serving as a positive terminal; a plurality of second aluminum foils, each two adjacent foils of the second aluminum foils being separated by a second preset gap and connected with each other by a second adhesive tape, each of the second aluminum foils having a second electrode lug, and all the second electrode lugs being connected in parallel for serving as a negative terminal; and a separation film disposed between the first aluminum foils and the second aluminum foils, and the stack is wound into a required shape.

12 Claims, 9 Drawing Sheets

(51) Int. Cl.
*H01G 11/08* (2013.01)
*H01G 11/12* (2013.01)
*H01G 11/22* (2013.01)
*H01G 11/30* (2013.01)
*H01M 2/34* (2006.01)
*H01M 10/04* (2006.01)
*H02H 5/04* (2006.01)
*H02J 7/00* (2006.01)

(56) References Cited

U.S. PATENT DOCUMENTS

2009/0311583 A1* 12/2009 Wu ................... H01M 2/0413
 429/82
2012/0026635 A1* 2/2012 Koyama .............. H01C 1/1406
 361/93.8

* cited by examiner

SECONDARY BATTERY MANUFACTURED BY ARRANGEMENT SIMULTANEOUSLY POSSESSING ADVANTAGES SPECIFIC TO WINDING PROCESS AND ADVANTAGES SPECIFIC TO STACKING PROCESS

BACKGROUND OF THE INVENTION

1. Field of the Invention

The present invention relates to a secondary battery manufactured by an arrangement simultaneously possessing advantages specific to a conventional winding process and advantages specific to a conventional stacking process.

2. Description of Related Art

There are a variety of secondary batteries including 18650 battery, 22650 battery, 40135 battery and aluminum soft pack battery, and two types of packaging processes, which are a winding process and a stacking process, are commonly seen for packing the above-mentioned secondary batteries.

Figure 1:
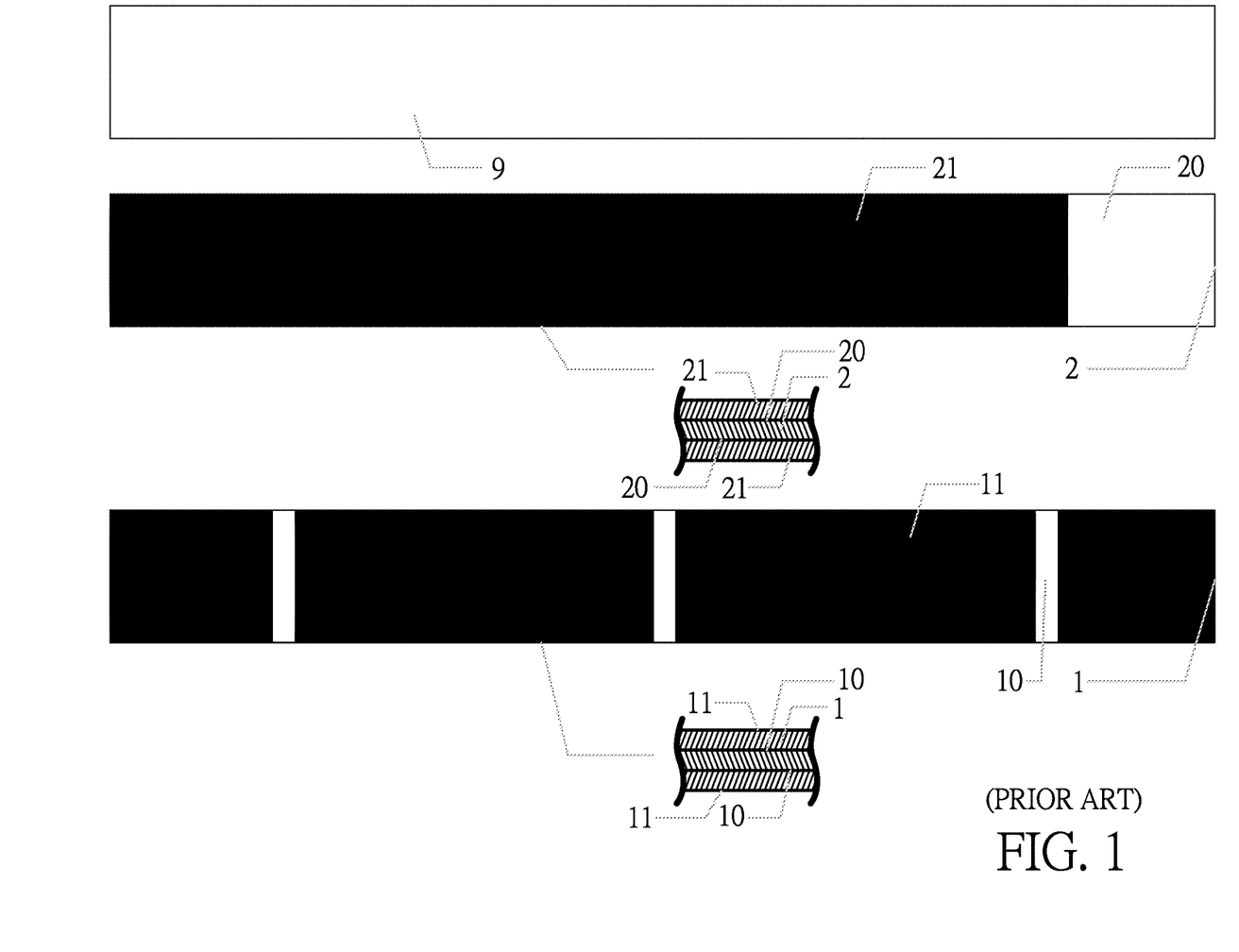
FIG. 1 is a schematic view illustrating main components of a secondary battery manufactured by a conventional winding process, wherein aluminum foils thereof are respectively coated with a positive terminal material and a negative terminal material.

As shown in FIG. 1, for a secondary battery manufactured by utilizing the winding process, a separation film 9 will be disposed between two aluminum foils 1, 2 having respective surfaces 10, 20 coated separately with a positive terminal material 11 and a negative terminal material 21, and then the aluminum foils 1, 2 with the separation film 9 therebetween will be wound into a cylindrical shape or a rectangular shape or a square shape for forming a cylindrical secondary battery (such as 18650 battery, 22650 battery or 40135 battery) or an aluminum soft pack secondary battery.

Figure 2:
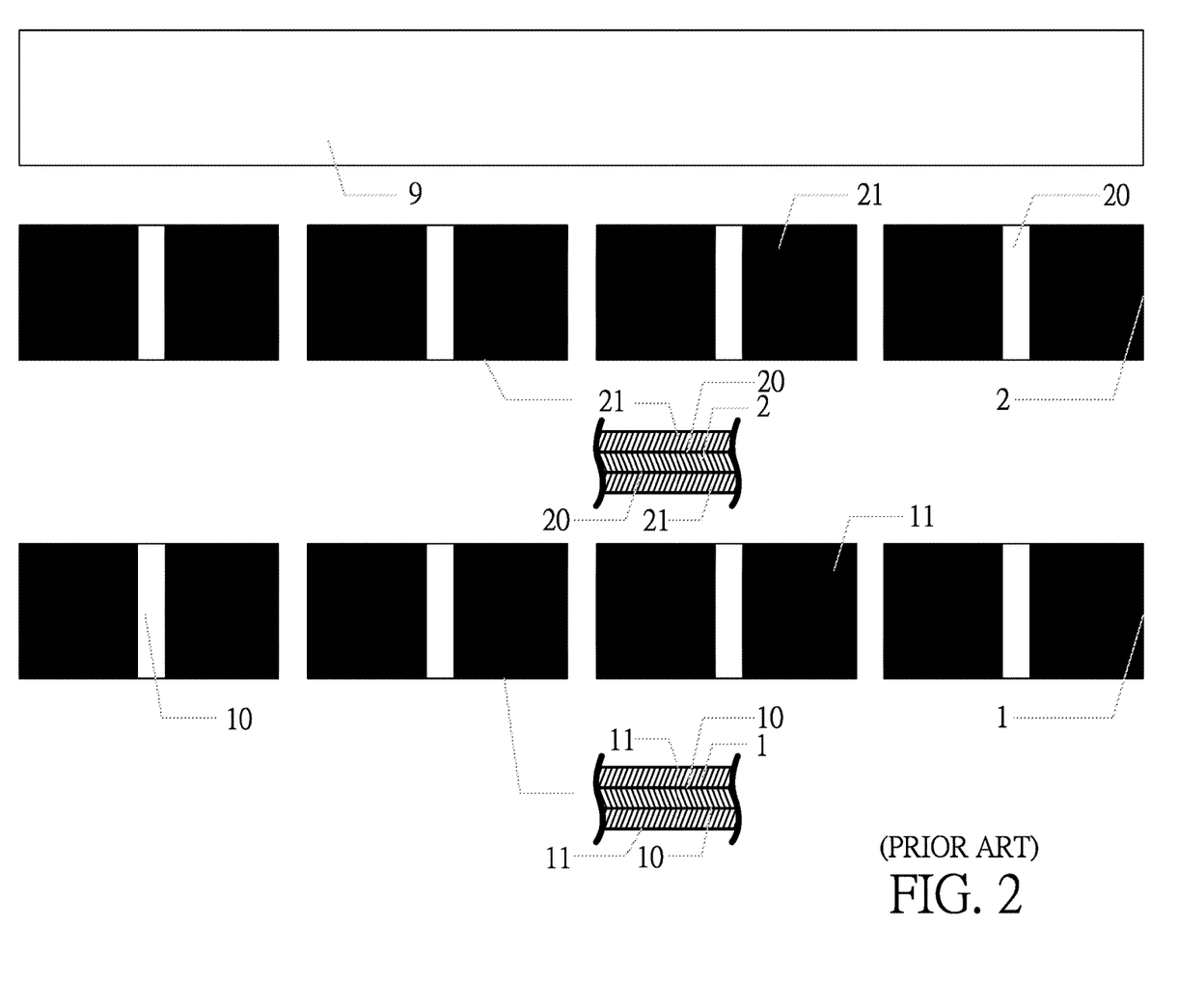
FIG. 2 is a schematic view illustrating main components of a secondary battery manufactured by a conventional stacking process, wherein aluminum foils thereof are respectively coated with a positive terminal material and a negative terminal material.

As shown in FIG. 2, for a secondary battery manufactured by utilizing the stacking process, a separation film 9 will be used to separate each pair of an aluminum foil 1 and an aluminum foil 2, and a plurality of aluminum foils 1, 2 having surfaces 10, 20 coated with an anode material 11 and a cathode material 21 respectively will be interlaced with each other with the separation film 9 folded therebetween, thereby forming an aluminum soft pack secondary battery.

The advantages of the winding process are that the automated production thereof is very efficient, the produced battery's size is relatively small and the battery's heat dissipating performance is good. However, the battery's charging/discharging current is very small.

The advantage of the stacking process is that the produced battery's charging/discharging current is large. However, the automated production thereof is slow, the produced battery's size is relatively bigger and the heat dissipating performance is poor.

In view of the pros and cons mentioned above, the applicant of the present invention has devoted to improving the secondary batteries and has achieved a secondary battery manufactured by an arrangement simultaneously possessing advantages specific to the conventional winding process and advantages specific to the conventional stacking process.

SUMMARY OF THE INVENTION

One objective of the present invention is to provide a secondary battery, which comprises:

a plurality of first aluminum foils respectively having a surface coated with a positive terminal material, each two adjacent foils of the first aluminum foils being separated by a first preset gap and connected with each other by a first adhesive tape to form a first interconnected foil layer, each foil of the first aluminum foils having a first electrode lug, and all the first electrode lugs being connected in parallel to serve as a positive terminal of the secondary battery for increasing a charging/discharging current as;

a plurality of second aluminum foils respectively having a surface coated with a negative terminal material, each two adjacent foils of the second aluminum foils being separated by a second preset gap and connected with each other by a second adhesive tape to form a second interconnected foil layer, each foil of the second aluminum foils having a second electrode lug, and all the second electrode lugs being connected in parallel to serve as a negative terminal of the secondary battery for increasing the charging/discharging current;

a separation film being placed between the first interconnected foil layer and the second interconnected foil layer to form a trilayer structure, the trilayer structure being wound into a predetermined shape;

a case for accommodating and sealing the trilayer structure in the predetermined shape; and an electrolyte filled in the case.

Another objective of the present invention is to provide a secondary battery, which comprises:

a first aluminum foil having a surface coated with a positive terminal material, and a plurality of first notches being formed at first preset locations along a length of the first aluminum foil, each of the first notches having a depth ranging from one half to three fourths of a width of the first aluminum foil, each of the first notches being covered by a first adhesive tape adhered with the first aluminum foil, thereby preventing the first aluminum foil from being cracked along the first notches while being pulled, and a plurality of first electrode lugs being provided along the length of the first aluminum foil at locations different from the first preset locations of the first notches, all the first electrode lugs being connected in parallel to serve as a positive terminal of the secondary battery for increasing a charging/discharging current;

a second aluminum foil having a surface coated with a negative terminal material, and a plurality of second notches being formed at second preset locations along a length of the second aluminum foil, each of the second notches having a depth ranging from one half to three fourths of a width of the second aluminum foil, each of the second notches being covered by a second adhesive tape adhered with the second aluminum foil, thereby preventing the second aluminum foil from being cracked along the second notches while being pulled, and a plurality of second electrode lugs being provided along the length of the second aluminum foil at locations different from the second preset locations of the second notches, all the second electrode lugs being connected in parallel to serve as a negative terminal of the secondary battery for increasing the charging/discharging current;

a separation film being placed between the first aluminum foil and the second aluminum foil to form a trilayer structure, the trilayer structure being wound into a predetermined shape;

a case for accommodating and sealing the trilayer structure in the predetermined shape; and an electrolyte filled in the case.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

In the detailed descriptions of preferred embodiments hereinafter, same or similar elements are represented by like reference numerals and redundant detailed descriptions will be omitted. Besides, to clearly disclose the characteristics of the present invention, the elements in the figures are not drawn to scale.

Figure 3:
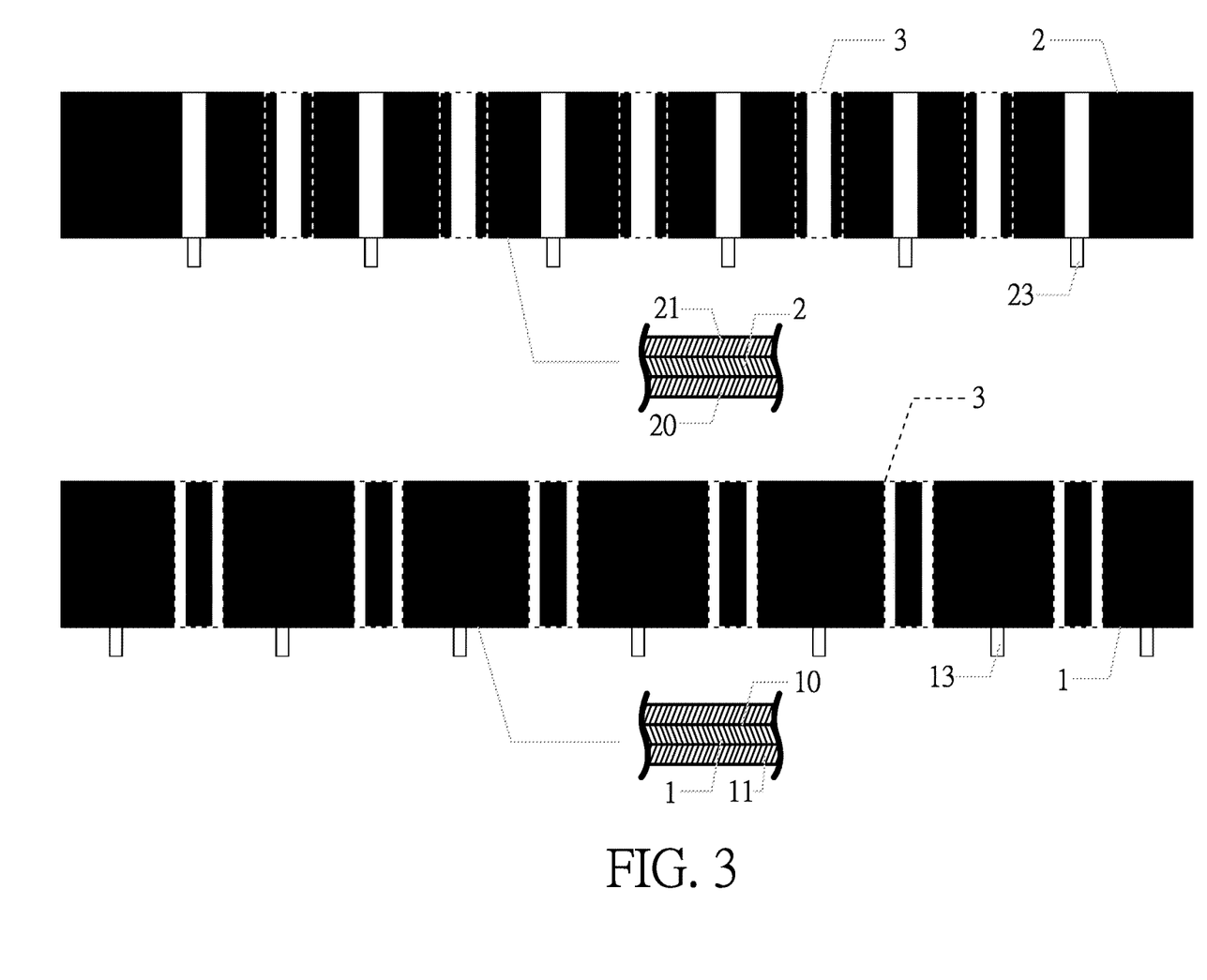
FIG. 3 is a schematic view illustrating main components for manufacturing a secondary battery by using an arrangement simultaneously possessing advantages specific to a conventional winding process and advantages specific to a conventional stacking process according to a first preferred embodiment of the present invention, wherein aluminum foils thereof are respectively coated with a positive terminal material and a negative terminal material.

Please refer to FIG. 3, which is a schematic view illustrating main components for manufacturing a secondary battery by an arrangement simultaneously having advantages specific to a conventional winding process and advantages specific to a conventional stacking process according to a first preferred embodiment of the present invention.

As shown in FIG. 3, an elongated aluminum foil is adopted and cut for forming a plurality of aluminum foils 1 respectively having a surface 10 coated with a positive terminal material 11. Each of the aluminum foils 1 is connected with an adjacent aluminum foil 1 via an adhesive tape 3 to form a first interconnected foil layer, and a preset gap is kept between each two adjacent aluminum foils 1. Another elongated aluminum foil is adopted and cut for forming a plurality of aluminum foils 2 respectively having a surface 20 coated with a negative terminal material 21. Each of the aluminum foils 2 is connected with an adjacent aluminum foil 2 via the adhesive tape 3 to form a second interconnected foil layer, and a preset gap is kept between each two adjacent aluminum foils 2. A separation film (as shown in FIG. 1) is then disposed between the first interconnected foil layer and the second interconnected foil layer to form a trilayer structure, and the trilayer structure can be wound into a cylindrical shape or a rectangular shape according to actual needs and sealed in a cylindrical case or a rectangular case with an electrolyte filled therein, thereby forming a cylindrical secondary battery (such as 18650 battery, 22650 battery or 40135 battery) or an aluminum soft pack secondary battery. As a result, the secondary battery manufactured according to the above-mentioned arrangement will simultaneously possess the advantages specific to the conventional winding process and the advantages specific to the conventional stacking process, thereby providing a charging rate ranging from 5 C to 20 C and a discharging rate ranging from 15 C to 60 C.

It is to be noted that the case is not limited to the above-mentioned cylindrical shape, but can be formed in any suitable geometric shape. Also, the aluminum soft pack case is not limited to the above-mentioned rectangular shape, but can be in any suitable geometric shape.

Figure 4:
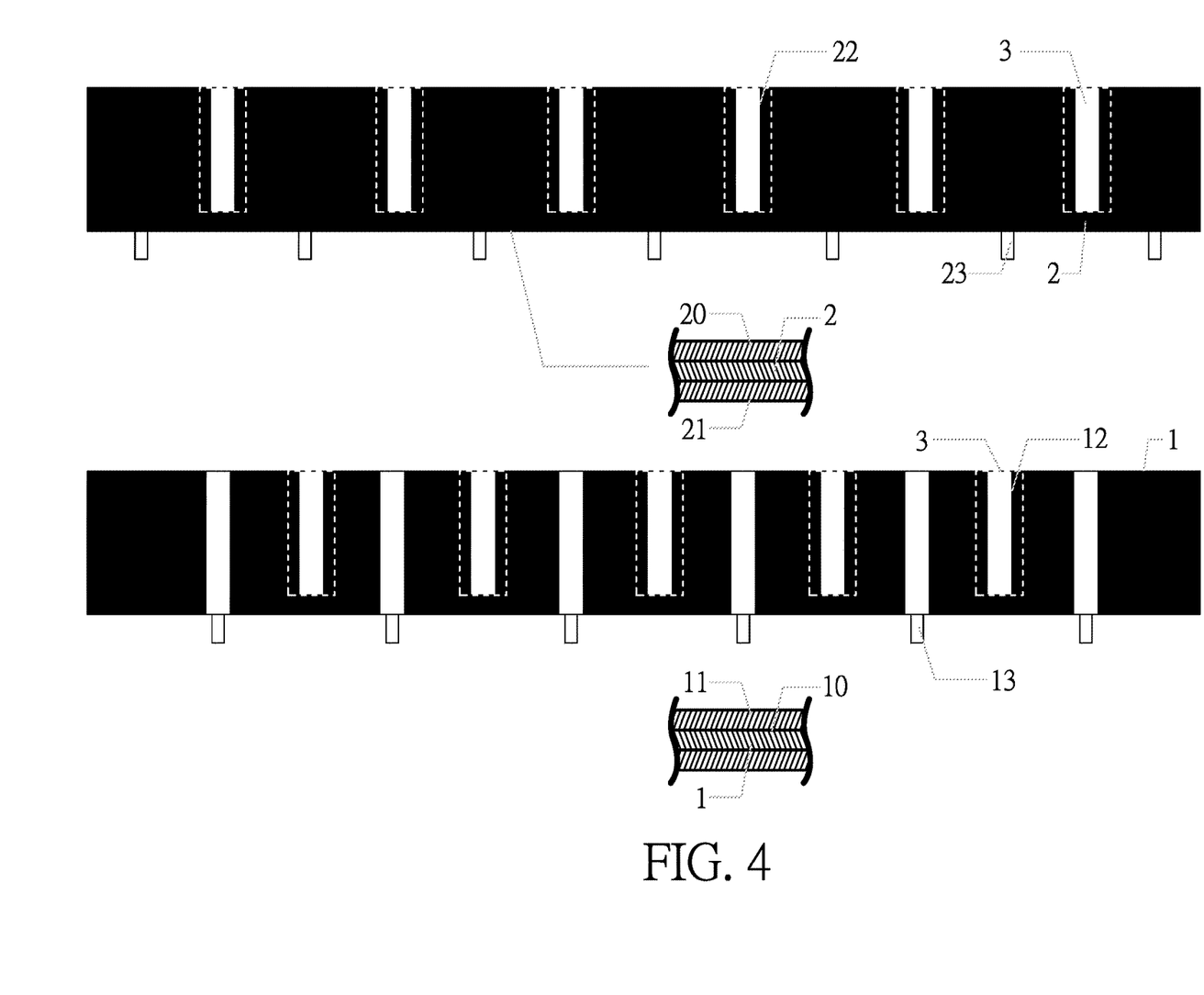
FIG. 4 is a schematic view illustrating main components for manufacturing a secondary battery by using an arrangement simultaneously possessing advantages specific to a conventional winding process and advantages specific to a conventional stacking process according to a second preferred embodiment of the present invention, wherein aluminum foils thereof are respectively coated with a positive terminal material and a negative terminal material.

Please refer to FIG. 4, which is a schematic view illustrating main components for manufacturing a secondary battery by an arrangement simultaneously having advantages specific to the conventional winding process and advantages specific to the conventional stacking process according to a second preferred embodiment of the present invention.

As shown in FIG. 4, an aluminum foil 1 having a surface 10 coated with a positive terminal material 11 is formed with a plurality of notches 12 at preset locations along a length of the aluminum foil 1, and the notches 12 have a depth ranging from one half to three fourths of a width of the aluminum foil 1. Each of the notches 12 is covered by an adhesive tape 3 adhered with the aluminum foil 1, thereby preventing the aluminum foil 1 from being cracked along the notches 12 while being pulled. In addition, an aluminum foil 2 having a surface 20 coated with a negative terminal material 21 is formed with a plurality of notches 22 at preset locations along a length of the aluminum foil 2, and the notches 22 have a depth ranging from one half to three fourths of a width of the aluminum foil 2. Each of the notches 22 is covered by an adhesive tape 3 adhered with the aluminum foil 2, thereby preventing the aluminum foil 2 from being cracked along the notches 22 while being pulled.

A separation film (as shown in FIG. 1) is then disposed between the aluminum foil 1 and the aluminum foil 2 to form a trilayer structure, and the trilayer structure can be wound into a cylindrical shape or a rectangular shape and sealed in a cylindrical case or a rectangular case with an electrolyte filled therein to form a cylindrical secondary battery (such as 18650 battery, 22650 battery or 40135 battery) or an aluminum soft pack secondary battery. As a result, the secondary battery manufactured according to the above-mentioned arrangement will simultaneously possess the advantages specific to the conventional winding process and the advantages specific to the conventional stacking process, thereby providing a charging rate ranging from 5 C to 20 C and a discharging rate ranging from 15 C to 60 C.

It is to be noted that, same as the possible variations mentioned in the description of the embodiment in FIG. 3, the case is not limited to the above-mentioned cylindrical shape, but can be formed in any suitable geometric shape. Also, the aluminum soft pack is not limited to the above-mentioned rectangular shape, but can be in any suitable geometric shape.

Moreover, it is to be noted that the embodiments of the present invention disclosed in FIG. 3 and FIG. 4 both have a feature different from and not seen in conventional secondary batteries, which is: a plurality of electrode lugs (electrode terminal metal pieces) 13, 23 are respectively provided in each of the aluminum foils 1, 2, so that a plurality of positive electrodes can be connected in parallel and a plurality of negative electrodes can be connected in parallel to increase a charging or discharging current $I_T=I_1+I_2+\ldots+I_n$, where n is a positive integer.

Figure 5:
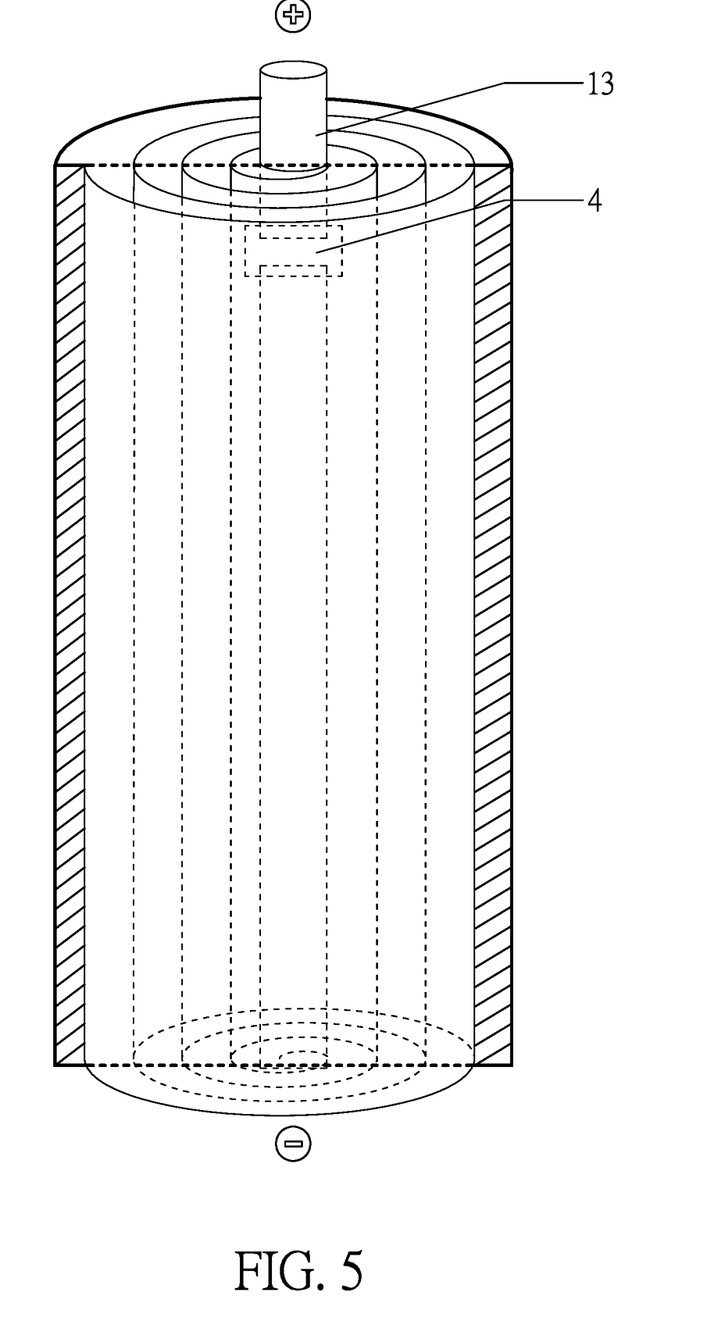
FIG. 5 is a schematic view illustrating an alternative embodiment of the present invention.

Please refer to FIG. 5, which is a schematic view illustrating an alternative embodiment of the present invention. As shown in FIG. 5, a temperature control switch 4 is disposed on an electrode lug 13 of the battery of the present invention. The temperature control switch 4 has a threshold temperature, for example under 300 Celsius degrees. When the battery is overly charged or overly discharged to cause the temperature of the battery to go up to reach the threshold temperature (120 Celsius degrees for example), the temperature control switch 4 will switch off to disrupt a current loop between the battery and a load, so that the output power (a product of an output current and an output voltage) of the battery can be decreased to zero to protect the battery from bursting or burning due to high temperatures.

Figure 6:
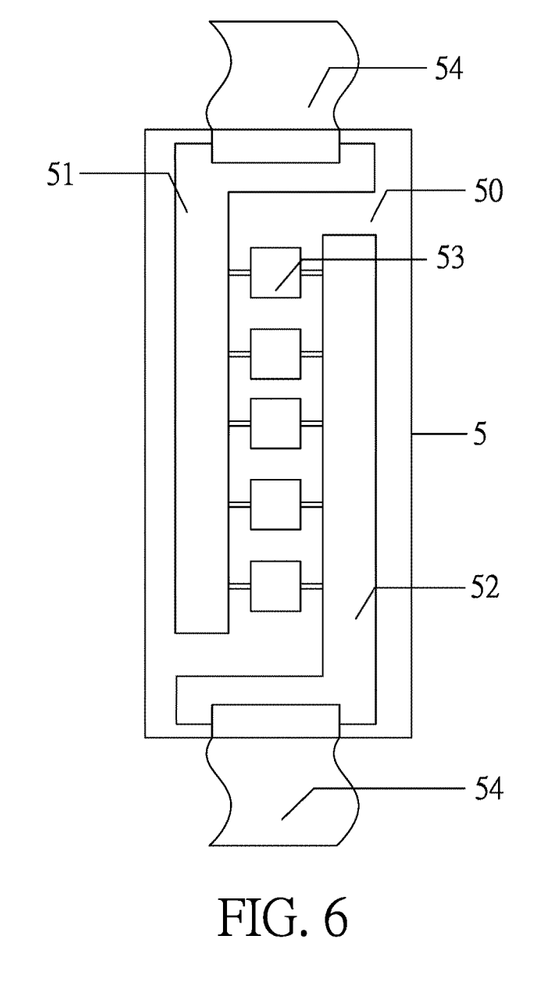
FIG. 6 and FIG. 7 illustrate another alternative embodiment of the present invention.
Figure 7:
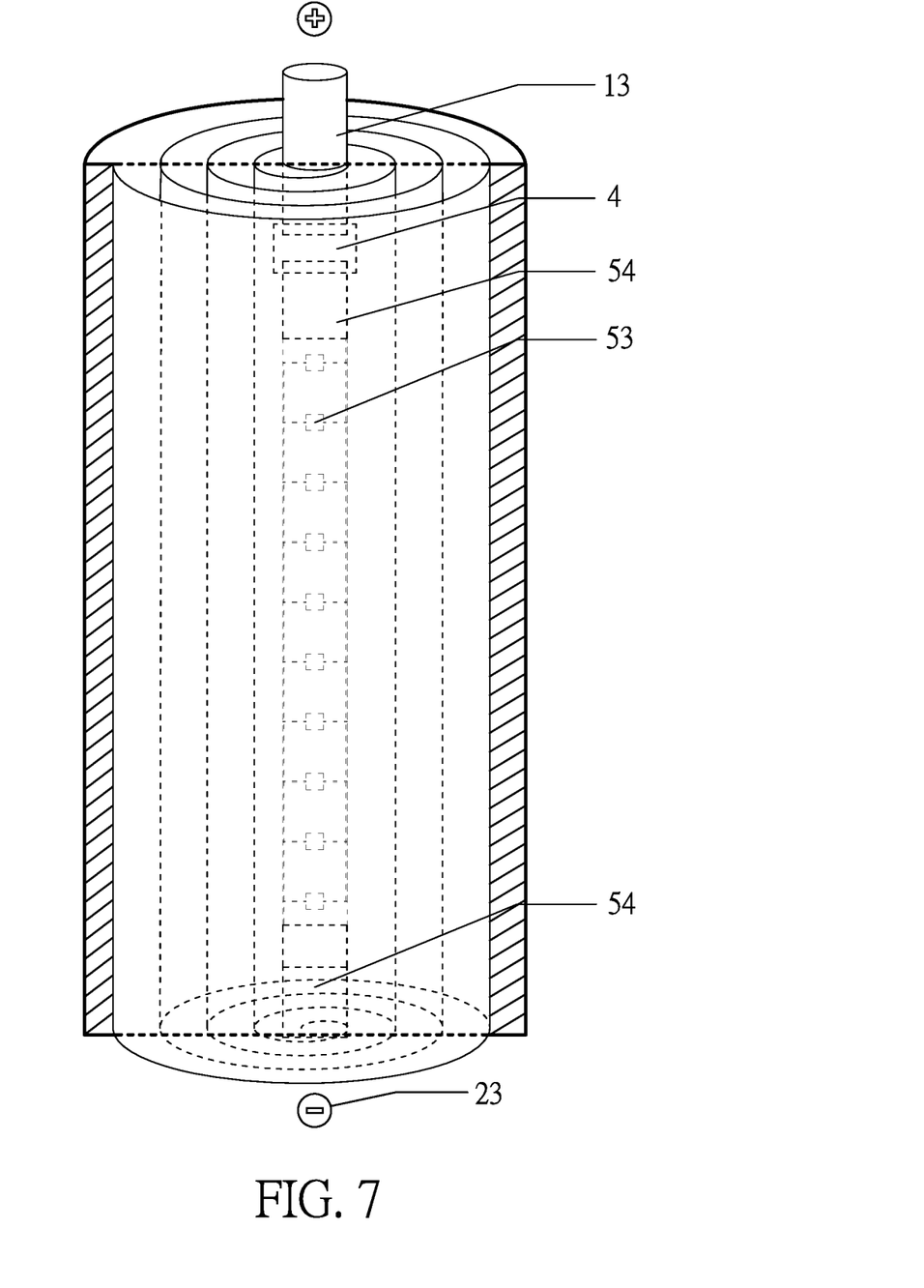

Please refer to FIG. 6 and FIG. 7, which are schematic views illustrating another alternative embodiment of the present invention. As shown in FIG. 6, a super capacitor substrate 5 is provided. The super capacitor substrate 5 includes a substrate 50, a first copper foil 51 electrically connected with the electrode lugs 13 of the battery through a metal sheet 54 (as shown in FIG. 7) or another equivalent conductive means, a second copper foil 52 electrically connected with the electrode lugs 23 of the battery through the another metal sheet 54 (as shown in FIG. 7) or another equivalent conductive means, and at least one capacitor 53 electrically connected with the first copper foil 51 and the second copper foil 52. In this embodiment, the super capacitor substrate 5 includes a plurality of capacitors 53. As shown in FIG. 7, the super capacitor substrate 5 is disposed at the center of a cylindrical battery thereby preventing the battery from being damaged by an inrushing current/voltage, and the super capacitor substrate 5 can also increase a power factor when used in driving a load.

Figure 8:
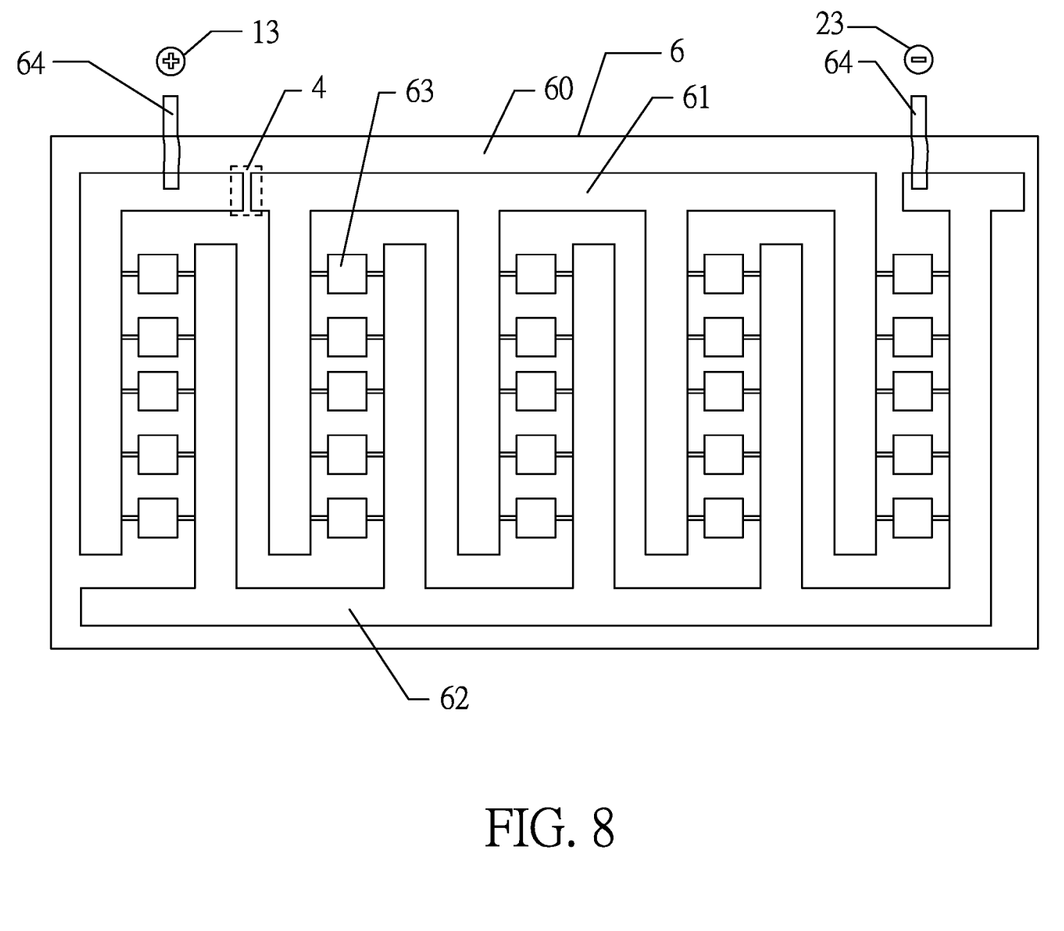
FIG. 8 and FIG. 9 illustrate still another alternative embodiment of the present invention.
Figure 9:
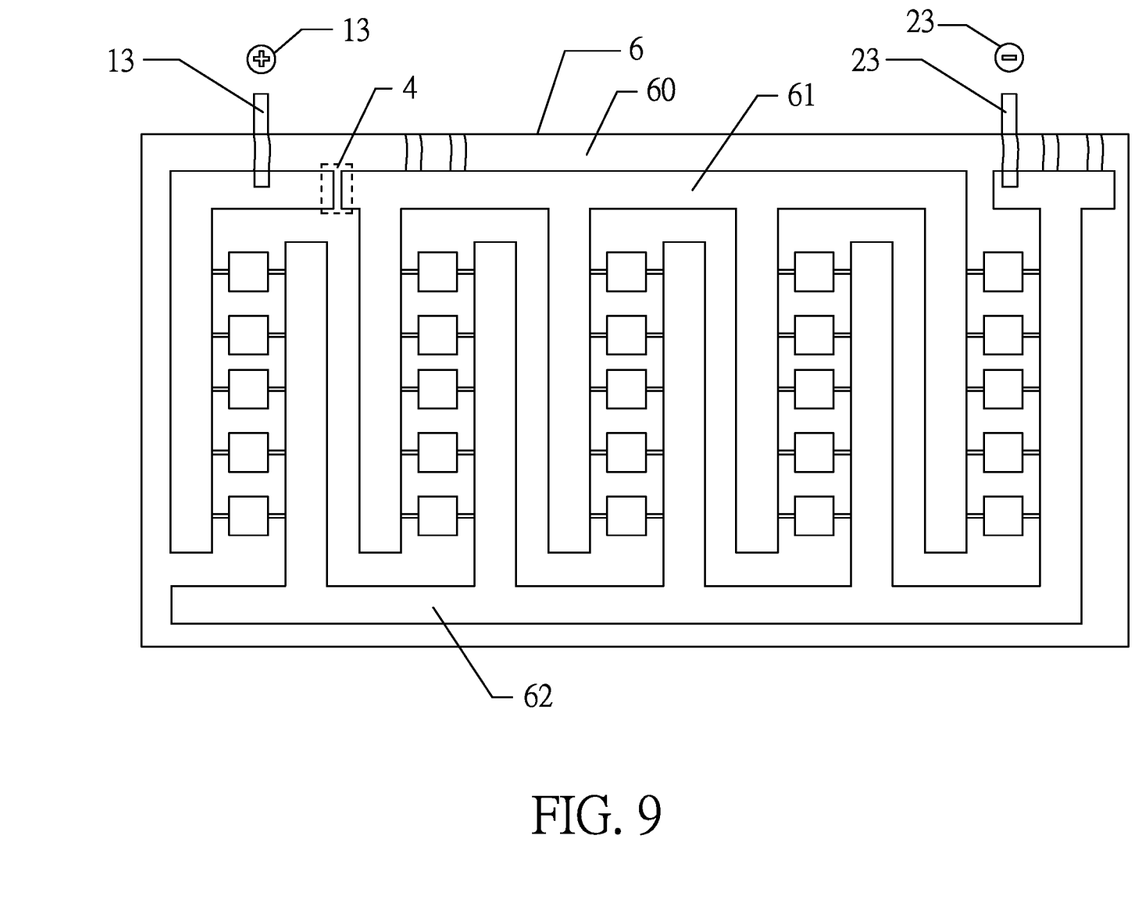

Please refer to FIG. 8 and FIG. 9, which are schematic views illustrating still another alternative embodiment of the present invention. As shown in FIG. 8, a super capacitor substrate 6 similar to the super capacitor substrate 5 disclosed in FIG. 6 and FIG. 7 is provided. The super capacitor substrate 6 includes a substrate 60, a first copper foil 61 electrically connected with the electrode lugs 13 of the battery through a metal sheet 64 (as shown in FIG. 9) or another equivalent conductive means, a second copper foil 62 electrically connected with the electrode lugs 23 of the battery through the another metal sheet 64 (as shown in FIG. 9) or another equivalent conductive means, and at least one capacitor 63 electrically connected between the first copper foil 61 and the second copper foil 62. In this embodiment, the super capacitor substrate 6 includes a plurality of capacitors 63. As shown in FIG. 9, the super capacitor substrate 6 is disposed at a center of a rectangular battery thereby preventing the battery from being damaged by an inrushing current/voltage, and the capacitor substrate 6 can also increase a power factor when used in driving a load.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A secondary battery, comprising:
   a plurality of first aluminum foils respectively having a surface coated with a positive terminal material, adjacent ends of each two adjacent foils of the first aluminum foils being separated by a first preset gap and connected with each other by a first adhesive tape to form a first interconnected foil layer, each foil of the first aluminum foils having a first electrode lug, and all the first electrode lugs being connected in parallel to serve as a positive terminal of the secondary battery for increasing a charging/discharging current;
   a plurality of second aluminum foils respectively having a surface coated with a negative terminal material, adjacent ends of each two adjacent foils of the second aluminum foils being separated by a second preset gap and connected with each other by a second adhesive tape to form a second interconnected foil layer, each foil of the second aluminum foils having a second electrode lug, and all the second electrode lugs being connected in parallel to serve as a negative terminal of the secondary battery for increasing the charging/discharging current;
   a separation film being located between the first interconnected foil layer and the second interconnected foil layer to form a trilayer structure, the trilayer structure being wound into a predetermined shape;
   a case for accommodating and sealing the trilayer structure in the predetermined shape;
   an electrolyte filled in the case; and
   a super capacitor substrate disposed at a center of the secondary battery, the super capacitor substrate includes: a substrate; a first copper foil electrically connected with the first electrode lugs through a first metal sheet; a second copper foil electrically connected with the second electrode lugs through a second metal sheet; and at least one capacitor electrically connected between the first copper foil and the second copper foil, thereby preventing the secondary battery from being damaged by an inrushing current/voltage, and thereby increasing a power factor when the secondary battery is used in driving a load.

2. The secondary battery as claimed in claim 1, wherein the case is formed in a cylindrical shape.

3. The secondary battery as claimed in claim 1, wherein the case is formed in a rectangular shape.

4. The secondary battery as claimed in claim 1, wherein the case is formed in a geometric shape.

5. The secondary battery as claimed in claim 1, further including a temperature control switch disposed on the positive terminal, the temperature control switch having a threshold temperature not larger than 300 Celsius degrees, wherein, when the secondary battery is overly charged or overly discharged to cause an ambient temperature of the secondary battery to go up to reach the threshold temperature, the temperature control switch will switch off to disrupt a current loop between the secondary battery and a load.

6. A secondary battery, comprising:
   a first aluminum foil having a surface coated with a positive terminal material, and a plurality of first notches being formed at first preset locations along a length of the first aluminum foil, each of the first notches having a depth ranging from one half to three fourths of a width of the first aluminum foil, each of the first notches being covered by a first adhesive tape adhered with the first aluminum foil, thereby preventing the first aluminum foil from being cracked along the first notches while being pulled, and a plurality of first electrode lugs being provided along the length of the first aluminum foil at locations different from the first preset locations of the first notches, all the first electrode lugs being connected in parallel to serve as a positive terminal of the secondary battery for increasing a charging/discharging current;

a second aluminum foil having a surface coated with a negative terminal material, and a plurality of second notches being formed at second preset locations along a length of the second aluminum foil, each of the second notches having a depth ranging from one half to three fourths of a width of the second aluminum foil, each of the second notches being covered by a second adhesive tape adhered with the second aluminum foil, thereby preventing the second aluminum foil from being cracked along the second notches while being pulled, and a plurality of second electrode lugs being provided along the length of the second aluminum foil at locations different from the second preset locations of the second notches, all the second electrode lugs being connected in parallel to serve as a negative terminal of the secondary battery for increasing the charging/discharging current;

a separation film disposed between the first aluminum foil and the second aluminum foil to form a trilayer structure, the trilayer structure being wound into a predetermined shape;

a case for accommodating and sealing the trilayer structure in the predetermined shape;

an electrolyte filled in the case; and a super capacitor substrate disposed at a center of the secondary battery, the super capacitor substrate includes: a substrate; a first copper foil electrically connected with the first electrode lugs through a first metal sheet; a second copper foil electrically connected with the second electrode lugs through a second metal sheet; and at least one capacitor electrically connected between the first copper foil and the second copper foil, thereby preventing the secondary battery from being damaged by an inrushing current/voltage, and thereby increasing a power factor when the secondary battery is used in driving a load.

7. The secondary battery as claimed in claim 6, wherein the case is formed in a cylindrical shape.

8. The secondary battery as claimed in claim 6, wherein the case is formed in a rectangular shape.

9. The secondary battery as claimed in claim 6, wherein the case is formed in a geometric shape.

10. The secondary battery as claimed in claim 6, further including a temperature control switch disposed on the positive terminal, the temperature control switch having a threshold temperature not larger than 300 Celsius degrees, wherein, when the secondary battery is overly charged or overly discharged to cause an ambient temperature of the secondary battery to go up to reach the threshold temperature, the temperature control switch will switch off to disrupt a current loop between the secondary battery and a load.

11. The secondary battery as claimed in claim 1, wherein the positive terminal material and the negative terminal material are implemented by a liquid state, solid state or semi-solid state gel-like material made of a metal oxide mixed with an acid or alkaline surfactant and an alcohol member.

12. The secondary battery as claimed in claim 6, wherein the positive terminal material and the negative terminal material are implemented by a liquid state, solid state or semi-solid state gel-like material made of a metal oxide mixed with an acid or alkaline surfactant and an alcohol member.

* * * * *